United States Patent [19]
Arpe

[11] 3,720,705
[45] Dec. 12, 1972

[54] PROCESS FOR THE MANUFACTURE OF β-ACETOXYPIVALIC ALDEHYDE

[75] Inventor: Hans-Jurgen Arpe, Fischbach/Taunus, Germany

[73] Assignee: Farbwerke Hoechst Aktiengesellschaft vormals Meister Lucius & Bruning, Frankfurt am Main, Germany

[22] Filed: Aug. 6, 1970

[21] Appl. No.: 61,854

[30] Foreign Application Priority Data

Aug. 13, 1969 Germany.....................P 19 41 184.8

[52] U.S. Cl. ...............260/494, 260/340.7, 260/491, 260/496

[51] Int. Cl...............................................C07c 67/00

[58] Field of Search........................................260/494

[56] References Cited

UNITED STATES PATENTS 3,251,876    5/1966    Morlock..............................260/488

Primary Examiner—Vivian Garner
Attorney—Curtis, Morris & Safford

[57] ABSTRACT

Process for the manufacture of β-acetoxypivalic aldehyde by the dosed addition of β-hydroxypivalic aldehyde and/or its dimer in an acetic acid solution to a boiling mixture of acetic acid, an entrainer and an acid catalyst at a rate which corresponds to the speed of formation of reaction water.

3 Claims, No Drawings

PROCESS FOR THE MANUFACTURE OF β-ACETOXYPIVALIC ALDEHYDE

The present invention relates to a process for the manufacture of β-acetoxypivalic aldehyde.

It has been proposed to manufacture β-acetoxypivalic aldehyde of the following formula

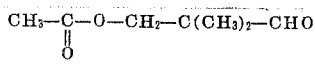

by acetylation of hydroxypivalic aldehyde or its dimer, 2-(alpha,alpha-dimethyl-β-hydroxyethyl)-5,5-dimethyl-6-hydroxy-1,3-dioxane. According to Hagemeyer and De Cress (The Chemistry of Isobutyraldehyde and its Derivatives, 1953, Bulletin of Eastman Kodak Company), the reaction of the hydroxyaldehyde with isopropenyl acetate as acetylating agent leads to a yield of 50 to 60 percent of β-acetoxypivalic aldehyde. For the reaction with acetic acid or with acetanhydride no yields have been indicated.

In U.S. Pat. No. 3,251,876 a method is described for the manufacture of β-acetoxypivalic aldehyde by heating β-hydroxypivalic aldehyde with a mixture of acetic acid and benzene in the presence of mineral acids or p-toluenesulfonic acid with the separation of water in a reflux condenser. After distilling off the benzene and the excess amount of acetic acid, the acetoxy aldehyde is obtained in pure form by distillation under reduced pressure. This process, carried out as a single-pot process, has the disadvantage that the sensitive hydroxypivalic aldehyde is exposed to the reflux temperature and the acid catalyst during the whole reaction time.

Japanese Pat. No. 29,923/68 describes the manufacture of β-acetoxypivalic aldehyde by reaction of β-hydroxypivalic aldehyde or its dimer with acetic acid at temperatures above 80°C in the absence of a catalyst. The said process avoids the detrimental influence of an acid catalyst, but uses a considerably prolonged reaction time so that the sensitive aldehyde is exposed to the detrimental action of the temperature to an increased degree.

The uncertainty how to choose the appropriate acetylation agent, for example, isopropenyl acetate, acetic acid or acetanhydride, and the appropriate catalyst, for example, mineral acids or p-toluenesulfonic acid, or whether to work in the absence of any catalyst, is due to the chemical behavior of the starting substance β-hydroxypivalic aldehyde which is present in a crystalline form as the dimer having the above dioxane structure.

By reacting, for example, the dimer with acetic anhydride in pyridine, the diacetate of the dimer is obtained (cf. Liebigs Ann. Chem., 627,96 (1959)). When the dimeric form of β-hydroxypivalic aldehyde is reacted in the presence of a mineral acid, for example hydrochloric acid, the dimer has a tendency to split off water and form a tetramer, i.e. tetraldane. From this follows that the acetylation should not be carried out in an alkaline or strongly acid medium.

It has furthermore been known that β-hydroxypivalic aldehyde is very unstable thermally and is either split into formaldehyde and isobutyraldehyde with realdolization or converted to the hydroxyneopentylic ester of β-hydroxypivalic acid with disproportionation of the aldehyde group. Also for this reason hydroxypivalic aldehyde puts special demands on the acetylation process.

Now I have found that the above side reactions can be substantially avoided and optimum yields of β-acetoxypivalic aldehyde can be obtained by choosing an appropriate catalyst and adding the dissolved β-hydroxypivalic aldehyde to a mixture of acetic acid and benzene drop by drop gradually as it is reacted to β-acetoxypivalic aldehyde.

The process of the invention for the manufacture of β-acetoxypivalic aldehyde by reaction of β-hydroxypivalic aldehyde and/or its dimer with acetic acid in the presence of an acid catalyst and an entrainer for the water comprises adding β-hydroxypivalic aldehyde and/or its dimer in an acetic acid solution to a boiling mixture consisting of acetic acid, an entrainer and an acid catalyst at a rate corresponding to the speed of formation of water.

In detail the process of the invention is performed such that the esterification is carried out with an excess amount of acetic acid of 2 to 8 times, preferably 4 to 6 times, the theoretical amount, using half the amount of the acetic acid used, together with a part of the entrainer serving to eliminate the water, for dissolving the hydroxyaldehyde and/or its dimer. As entrainer there may be used substances forming an azeotropic mixture with water, for example, methylene chloride, chloroform, trichlorethylene, carbon tetrachloride, and preferably cyclohexane or benzene. The other half of the acetic acid is placed together with the remaining amount of entrainer and the acid catalyst in the apparatus which is provided with a water separator.

When the solution of β-hydroxypivalic aldehyde is added dropwise to the boiling mixture of acetic acid, entrainer and catalyst, esterification sets in immediately, as can be recognized by the separation of water, in spite of the initially very small concentration of aldehyde, this being surprising. Thus the sensitive hydroxyaldehyde is converted to stable acetoxyaldehyde and no longer exposed to the action of the temperature and the catalyst. The rate of addition of hydroxyaldehyde is increased until it corresponds to the rate of elimination of the theoretical amount of water (in the form of a diluted acetic acid). By proceeding in this manner, the residence time of the β-hydroxypivalic aldehyde in the reaction medium is only short so that the β-hydroxypivalic aldehyde cannot enter into side reactions.

When working in the absence of an acid catalyst, for example, a mineral acid, an acid ion exchanger or an organic acid, for example p-toluenesulfonic acid, the esterification proceeds considerably more slowly and thermally initiated side reactions take place.

Of the above acid catalysts, p-toluenesulfonic acid is preferably used. The latter may be used in an amount within the range of from 0.01 to 1 mol percent, preferably 0.1 mol percent, calculated on the β-hydroxypivalic aldehyde. When, instead of p-toluenesulfonic acid, a mineral acid, for example sulfuric acid, is used in the same concentrations, no optimum yields of acetoxypivalic aldehyde can be obtained, because relatively large amounts of higher boiling products are formed, which is obviously due to the above mentioned tetramerization.

When, instead of the dosed addition in accordance with the invention which is synchronous with the speed of reaction, a single pot process is used in which all the reaction components as well as the catalyst and the entrainer for the water are present in the reaction vessel from the beginning, low boiling and high boiling secondary products are formed at the expense of β-acetoxypivalic aldehyde.

After the theoretical amount of water has been separated, the entrainer and the acetic acid in excess are distilled off, and the β-acetoxypivalic aldehyde is distilled under reduced pressure. The yield is about 97 percent of the theoretical.

β-Acetoxypivalic aldehyde is an important intermediate for the manufacture of pivalolactone which is the starting product for polypivalolactone, a polyester which is used as thermoplastic and for the manufacture of fibers.

The following examples serve to illustrate the invention.

EXAMPLE 1

Two hundred fifty-four grams β-hydroxypivalic aldehyde in the form of the dimer thereof were dissolved at room temperature in a mixture of 300 grams acetic acid and 500 milliliters benzene. The resulting solution was added dropwise in the course of 6 hours to a boiling solution of 5 grams p-toluenesulfonic acid in 300 grams acetic acid and 500 milliliters benzene. The water which was formed was removed in the form of diluted acetic acid through a water separator. After that time, the separation of water was terminated and the benzene and the acetic acid in excess were distilled off under atmospheric pressure. As this mixture was used again for the esterification after the consumed acetic acid had been replaced, the small amount of β-acetoxypivalic aldehyde which distilled over azeotropically could also be returned. The residue was subjected to a fractional distillation under a pressure of 20 millimeters of mercury. There were obtained 347 grams = 96.6 mol percent β-acetoxypivalic aldehyde having a boiling point b.p.$_{20}$ 85°C.

EXAMPLE 2

By using, instead of p-toluenesulfonic acid, 0.5 milliliter concentrated sulfuric acid as catalyst, while otherwise proceeding under the same conditions as those described in Example 1, the yield of β-acetoxypivalic aldehyde was reduced to 76.0 mol percent.

EXAMPLE 3

When proceeding under the conditions of Example 1, but using, instead of the method of dropwise addition, a single pot process in which the total amount of reactants was simultaneously present, a yield of only 81.6 mol percent β-acetoxypivalic aldehyde was obtained.

What is claimed is:

1. In a process for the manufacture of β-acetoxypivalic aldehyde by reaction of β-hydroxypivalic aldehyde or its dimer or mixtures thereof with acetic acid in the presence of an acid catalyst and an entrainer for water, the improvement which comprises adding β-hydroxypivalic aldehyde or its dimer or mixtures thereof in an acetic solution to a boiling mixture consisting of acetic acid, the total amount of which is 2 to 8 times the theoretical amount, an entrainer selected from the group consisting of benzene and cyclohexane, and p-toluenesulfonic acid as catalyst at a rate corresponding to the speed of formation of water of reaction.

2. The process of claim 1 wherein p-toluenesulfonic acid is used in an amount within the range of from 0.01 to 1 mol percent, calculated on the β-hydroxypivalic aldehyde.

3. The process of claim 1 wherein p-toluenesulfonic acid is used in an amount of 0.1 mol percent, calculated on the β-hydroxypivalic aldehyde.

* * * * *